United States Patent [19]
Senoh

[11] Patent Number: 5,914,580
[45] Date of Patent: Jun. 22, 1999

[54] DRIVE CONTROL DEVICE FOR A STEPPING MOTOR

[75] Inventor: Masakazu Senoh, Yonago, Japan

[73] Assignee: Matsushita Electric Industrial Co., Ltd., Osaka, Japan

[21] Appl. No.: 08/978,443

[22] Filed: Nov. 25, 1997

[30] Foreign Application Priority Data

Nov. 26, 1996 [JP] Japan ..................................... 8-314568

[51] Int. Cl.⁶ ....................................................... H02P 8/00
[52] U.S. Cl. ............................................. 318/696; 318/685
[58] Field of Search ..................................... 318/696, 685,
318/494, 495, 671, 126, 127, 129, 599,
684, 265, 266

[56] References Cited

U.S. PATENT DOCUMENTS 4,476,421  10/1984  Moriguchi ................................ 318/696

FOREIGN PATENT DOCUMENTS 6343294  12/1994  Japan .

Primary Examiner—William M. Shoop, Jr.
Assistant Examiner—Rina Duda
Attorney, Agent, or Firm—Greenblum & Bernstein P.L.C.

[57] ABSTRACT

A drive control device for a stepping motor (1) includes a step signal generator (6) for generating a step pulse signal (e) at a constant interval of a period (T1), and an exciting signal generator section (2, 3) for generating an exciting signal in accordance with the step pulse signal, driving the stepping motor in accordance with the exciting signal, where the step pulse signal (e) with the constant period (T1) is obtained in the step signal generator based on externally supplied step data (a) including a step number (n) of a constant period (T0) designating a rotation of the stepping motor to a target position, and even when the step number of the stepping motor is increased in dividing a dummy sine wave stored in ROMs, the processing time of a microcomputer is not affected, attaining a high accuracy in step drive positioning of a stepping motor with smooth rotation thereof.

10 Claims, 5 Drawing Sheets

DRIVE CONTROL DEVICE FOR A STEPPING MOTOR

BACKGROUND OF THE INVENTION

1. Field of the Invention

The present invention generally relates to a drive control device for a stepping motor to produce mechanical rotation dependent on steps from one angular position to another, and in particular to a drive control device for controlling a microstep drive of a stepping motor capable of smoothly rotating with a high accuracy in angular positioning by increasing the number of steps without requiring a high speed processing of a microcomputer in generating a step signal.

2. Description of the Prior Art

In recent years, a microstep drive of a stepping motor is realized by an open-loop control system by way of converting digital signals to mechanical rotation, and since a servo mechanism can be easily constructed with high accuracy without providing a feedback component such as an encoder or potentiometer, a microstep drive of a stepping motor is widely used as a drive power supply for driving, e.g., a magnetic recording head of a magnetic disk device and other various apparatuses. In such a wide utilization, a stepping motor serves as a link or interface between computers and mechanical devices, having an extensive usage in equipment coupling to computers, such as printers, plotters, magnetic memory disks and the like, providing very accurate mechanical positioning without any feedback, and thus the stepping motor can be used in various automatic control systems, home and office appliances, audio/video apparatuses and the like.

Conventionally, there has been proposed a drive control device for a stepping motor as disclosed, for example, in the Japanese patent unexamined laid open publication 343294/1994 in which a rotation for each one pulse is corrected to be uniform in microstep driving of a stepping motor.

In the disclosure of this conventional construction, as shown in FIG. 5, in microstep driving of a stepping motor 1, a step signal "i" of pulse clocks indicating steps for each angular position generated by a step signal generator (not shown) is counted up or down by an up/down counter 2 in accordance with a rotational direction signal "h" indicating a rotational direction of the motor to thereby generate count value data. The count value data output of the up/down counter 2 is applied to ROMs 3a and 3b storing an exciting signal data corresponding to the count value data. Thus, the count value data is used as address data for the exciting data stored in the ROMS. The exciting signal data stored in ROMs 3a and 3b is read out therefrom and then converted to analog voltage signals by means of D/A converters 4a and 4b, and then the converted voltage signals are amplified by means of drive amplifiers 5a and 5b to thereby drive the stepping motor 1.

In this arrangement, the exciting signal data of the ROMs 3a and 3b is converted to an analog form of dummy sine wave to increase the number of steps for one rotation of the stepping motor. By increasing the number of steps for a unit rotation, the accuracy of the step angular positioning can be made higher together with attaining a smooth rotation of the stepping motor.

In the conventional construction, however, in order to obtain a high accuracy of the step angular positioning together with smooth rotation of the stepping motor, it is necessary to increase the number of steps for the angular positioning and the number of divided segments of the dummy sine waves. Thus, the number of steps for rotating the stepping motor to a target position is increased, and therefore a microcomputer included in the step signal generator (not shown) is required to have a higher speed processing performance, which arises a problem of a high cost in constructing the drive control device.

SUMMARY OF THE INVENTION

Thus, the present invention has been made to solve this problem, having an essential objective to provide an improved stepping motor drive device capable of smoothly rotating with a high accuracy in angular positioning by increasing the number of steps without requiring a high speed processing of a microcomputer in generating a step signal.

In order to achieve the objective mentioned above, the present invention provides a drive control device for controlling a microstep drive of a stepping motor which comprises: a step signal generator for generating a step pulse signal (e) at a constant interval of a period (T1); an exciting signal generator section for generating an exciting signal in accordance with the step pulse signal; and a drive signal generator section for generating a drive signal for driving the stepping motor in accordance with the exciting signal, wherein the step pulse signal (e) with the constant period (T1) is obtained in the step signal generator based on externally supplied step data (a) including a step number (n) of a constant period (T0) designating a rotation of the stepping motor to a target position.

In the drive control device, assuming that the number of the steps included in the data (a) held by a latch unit is "n" and that the count value data (d) counted by a counter is "m" where "m" is an integer equal to or larger than 1, the step pulse signal (e) is generated from a selector unit at a timing when the count value "m" meets the following condition:

$$m = T0/[Tc \times (n+1)] \tag{1}$$

where T0 is the period of applying the data (a) of the step number "n" and Tc is the period of the count value data (d).

Moreover, in the drive control device of the present invention, the selector unit includes step number judging units for judging the state of the number "n" of the steps, count value judging units for judging the count value "m", AND circuits for obtaining logical products between the outputs of the step number judging units and the outputs of the count value judging units, and an OR circuit for obtaining a logical sum of the outputs of the AND circuits.

According to the first aspect of the present invention, even when the step number of the stepping motor is increased to increase the division segments of a dummy sine wave stored in ROMs, the processing time of a microcomputer is not affected, and therefore a high accuracy in step drive positioning of a stepping motor can be advantageously obtained with smooth rotation thereof.

According to the second aspect of the present Invention, it is not necessary to use an arithmetic circuit such as a dividing circuit for calculating a count value "m" for the step number "n", and therefore a high speed processing can be attained with a simple and easy construction.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENT

Figure 1:
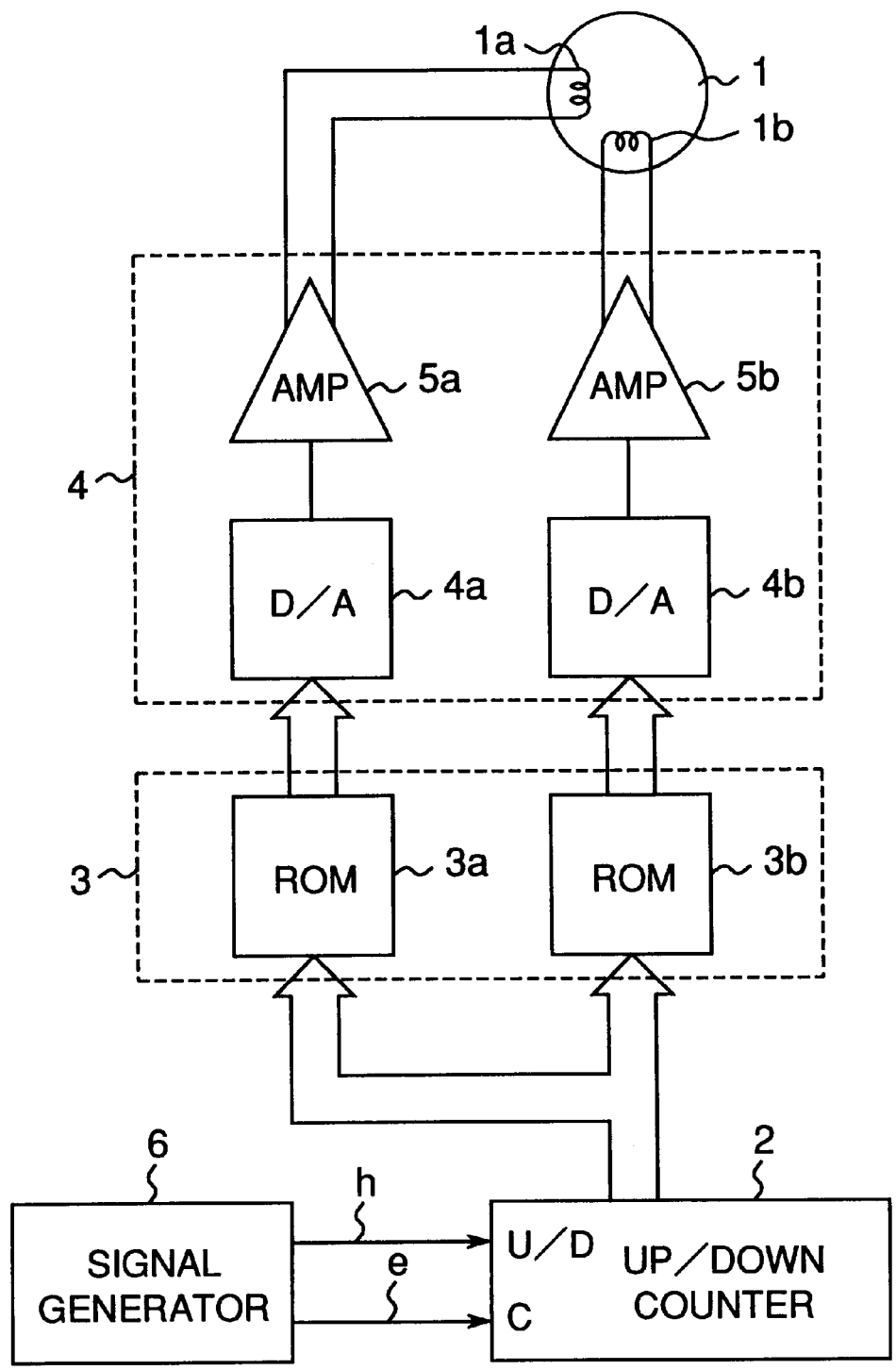
FIG. 1 is a block diagram showing a construction of a drive control device for a stepping motor according to an embodiment of the present invention.
Figure 2:
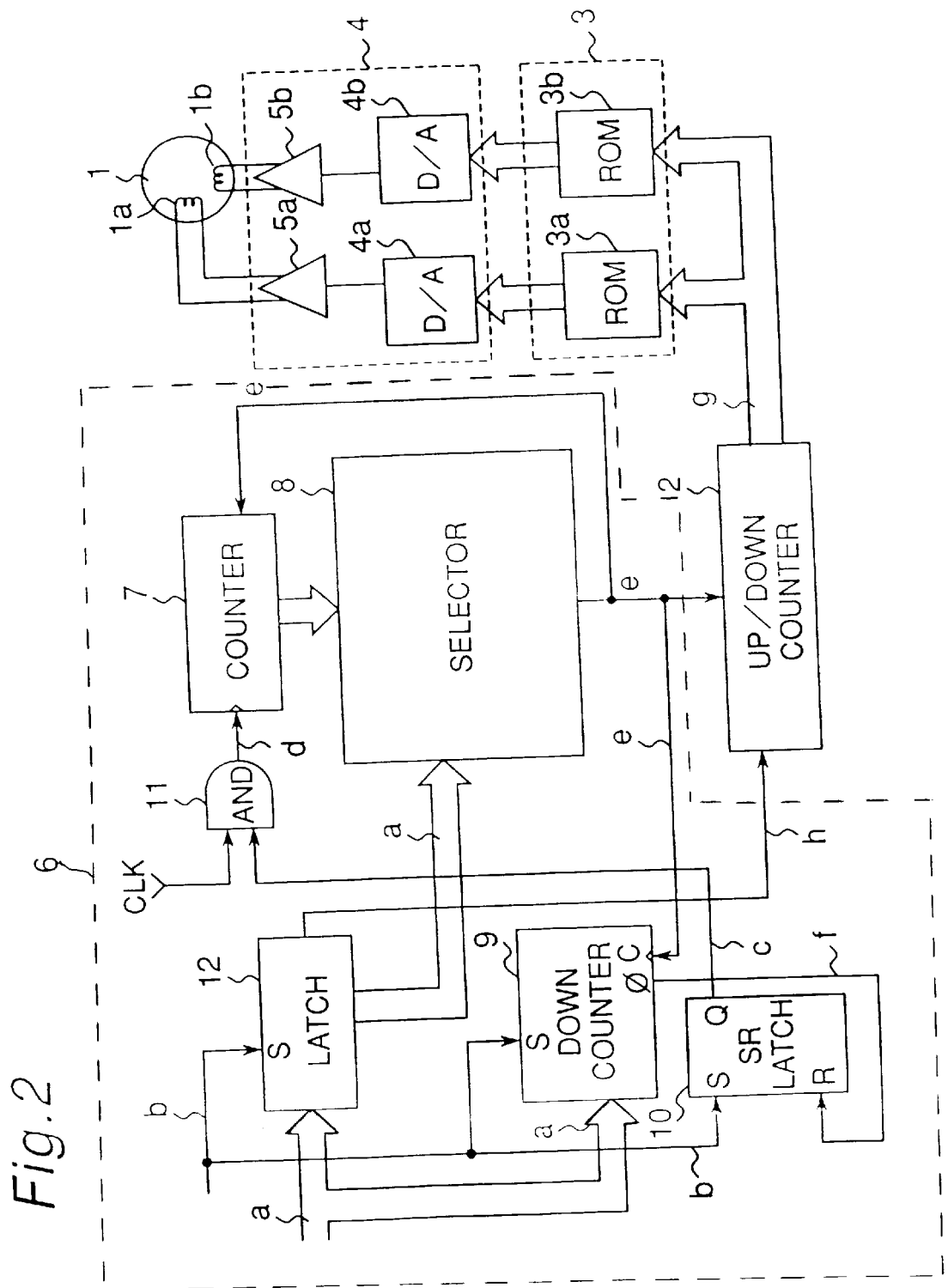
FIG. 2 is a block diagram showing a construction of a signal generator in connection with the drive control device shown in FIG. 1.

Before the description proceeds, it is noted here that, since the basic structure of the present invention is similar to that of the conventional one, like parts are designated by like reference numerals throughout the drawings.

The following describes a preferred embodiment of the present invention with reference to FIGS. 1 through 4.

FIG. 1 shows a schematic construction of a drive control device for controlling a microstep drive of a stepping motor 1 in connection with a step signal generator 6 for generating a step signal "e" of a pulse signal, where the stepping motor 1 has a first and second stator coils 1a and 1b. Reference numeral 2 denotes an up/down counter for counting up and down the step pulse signal "e" fed from the step signal generator 6.

The step pulse signal "e" fed to the up/down counter 2 is used for designating steps for each angular position of the stepping motor and is counted up and down by the up/down counter 2 in accordance with a rotational direction signal "h" applied to an input terminal U/D thereof from the step signal generator 6. The counting direction of the up/down counter 2 is decided by the rotational direction signal "h" and the counting operation is started upon receipt of the step pulse signal "e" to thereby generate the count value data "g" counted by the up/down counter 2. The count value data "g" outputted from the up/down counter 2 serves as address data indicating a step count value for designating a rotor angular position of the motor 1.

The count value data "g" output of the up/down counter 2 is applied to a subsequent memory section 3 which is comprised of a first and second ROMs 3a and 3b where exciting signal data of a dummy sine waveform corresponding to the count value data "g" is previously stored in conformity to characteristics of the motor when the drive control device is designed in manufacturing the motor. This means that the count value data "g" is used as address data for the exciting signal data stored in the ROMs. The up/down counter 2 in combination with the memory section 3 constitute an exciting signal generator section. The output of the ROMs 3a and 3b is applied to an exciting signal control section 4 serving as a drive signal generator section which is comprised of first and second D/A converters 4a, 4b and first and second drive amplifiers 5a, 5b.

In this construction, there may be used an up/down counter of, e.g., 8-bit type for uniformly dividing one rotational period of the stepping motor into, e.g., 256 segments in microstep driving. Thus, the exciting signal data is stored in the less significant address in the ROMs 3a and 3b while the count value data "g" is inputted to the more significant address in the ROMs 3a and 3b. By this address connection, the exciting signal data can be read out of the ROMs in response to the excitation position assigned by the address data "g", thereby allowing to apply a high frequency oscillation to the motor as to generate a high frequency oscillation torque.

The exciting signal data read out of the ROMs is then converted to analog voltage signals by means of the D/A converters 4a and 4b in the exciting signal control section 4. Then, the voltage signals are transmitted to the first and second drive amplifiers 5a and 5b. Thus, the drive amplifiers 5a and 5b drive the stator coils 1a and 1b of the stepping motor 1 with use of the amplified drive voltage signals.

In this arrangement, the exciting signal data stored in the ROMs 3a and 3b are sequentially read out therefrom in receipt of the step count value data "g" serving as the address data, and then converted to an analog form of dummy sine wave to increase the number of steps for a unit rotation of the stepping motor. By increasing the number of steps for a unit rotation, the accuracy of the step angular positioning of the rotor can be made higher together with attaining a smooth rotation of the stepping motor.

The following describes a construction of the step signal generator 6 for generating the step pulse signal "e" to be applied to the up/down counter 2 with reference to FIGS. 2 and 3A–3G.

The step signal generator 6 is comprised of a latch unit 12, counter 7, selector unit 8, down counter 9, SR latch unit 10 and AND circuit 11.

Figure 3A:
FIGS. 3A, 3B, 3C, 3D, 3E, 3F and 3G are timing charts for explaining an operation of the present embodiment.

Initially, data "a" indicating a number "n" of steps for rotating the stepping motor 1 to a target position together with a rotational direction signal "h" is calculated by way of e.g. a microcomputer (not shown) and the calculated data "a" is applied to the latch unit 12 and down counter 9 in parallel at a timing with a constant interval of a period To as shown in FIG. 3A.

Figure 3B:
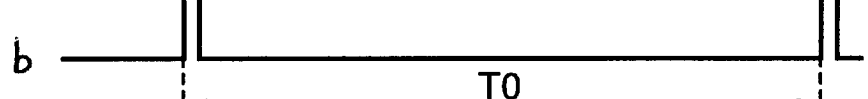

In synchronization with the data "a", a setting signal "b" of a synchronization pulse signal having the same constant period TO as shown in FIG. 3B is simultaneously applied to input set terminals (S) of the latch unit 12, down counter 9 and SR latch unit 10 in parallel.

Figure 3C:
Figure 3D:

At a time $t_0$, upon receipt of the setting pulse signal "b", the data "a" including the step number "n" is held in the latch unit 12 and down counter 9, and at the same time the SR latch unit 10 is established to generate High of a binary output signal "c" as shown in FIG. 3C. The output signal "c" of the SR latch unit 10 and an external reference clock pulse CLK having a constant period Tc are both fed to the AND circuit 11 to thereby generate a clock pulse signal "d" having the same constant period Tc in synchronization with the reference clock pulse CLK as shown in FIG. 3D. Then the clock pulse signal "d" is fed to the counter 7 for counting the pulse number of the input clock pulse signal "d".

Figure 3E:
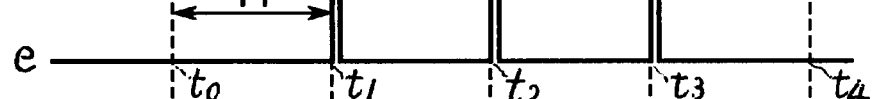

The counted value "m" of the clock pulse "d" is outputted from the counter 7 and fed to the selector unit 8. At the same time, the data "a" including the step number "n" held by the latch unit 12 is also applied to the selector unit 8 so that the selector unit 8 generates the count signal "e" at predetermined timings $t_1$, $t_2$, and $t_3$ with a constant time interval of a period T1 as shown in FIG. 3E.

Referring to the timing of generating the count signal "e" from the selector unit 8, assuming that the number of the steps included in the data "a" held by the latch unit 12 is "n" and that the count value data of the clock pulse signal "d" counted by the counter 7 is "m" where "m" is an integer equal to or larger than 1, the count signal "e" is generated by the selector unit 8 at a timing when the count value "Im" meets the following condition:

$$m=T0/[Tc\times(n+1)] \quad (1)$$

The count signal "e" output of the selector unit 8 is fed back to the counter 7 for resetting the counting operation thereof so that the counter 7 restarts the counting operation of the clock pulse signal "d".

Figure 3F:

The count signal "e" is also applied to an input terminal C of the down counter 9 and, upon receipt of the count signal "e", the down counter 9 starts the down count operation of the data "a" held therein by the setting signal "b" from the initialized value of the step number "n" to generate a down-counted value signal "f" as shown in FIG. 3F. The down-counted value signal "f" generated by the down counter 9 is applied to a reset input terminal R of the SR latch unit 10.

When the down-counted value "f" output of the down counter 9 is "0", at the time $t_3$ as shown in FIG. 3F, the SR latch unit 10 is resetted to generate LOW level of the binary output signal "c" in the duration from time $t_3$ to $t_4$ as shown in FIG. 3C. Then the LOW of the binary signal "c" is applied to the AND circuit 11 so that the reference clock signal CLK is masked with the output signal "c" to stop the supply of the clock pulse signal "d" to be zero.

Thus, the count signal "e" is generated "n" times with a constant interval of a period T1 during the constant period T0 every time the count value "m" output of the counter 7 satisfies the equation (1), and the resultant count signal "e" is. applied to the up/down counter 2 for serving as the step signal. In this example shown in FIGS. 3A to 3G, however the step number "n" is 3, and T0/Tc=12, T1/Tc=3, and m=3 are satisfied, it is not necessary to limit the present invention to these values.

Figure 3G:
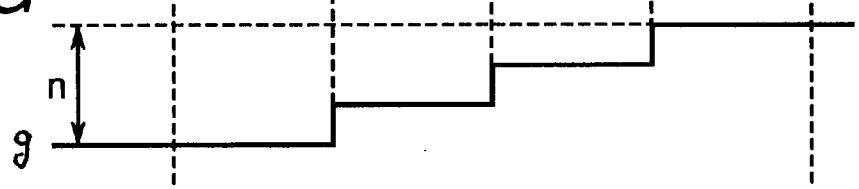

In the meanwhile, a rotational direction signal "h" included in the data "a" held in the latch unit 12 is applied to the U/D terminal of the up/down counter 2 to designating the counting direction of the up/down counter. The counting operation by the up/down counter 2 is started upon receipt of the step signal "e" to thereby generate the count value data "g" as shown in FIG. 3G, which the count value data "g" outputted from the up/down counter 2 is used as the address data indicating a step count value for designating a rotor angular position of the motor 1.

Figure 4:
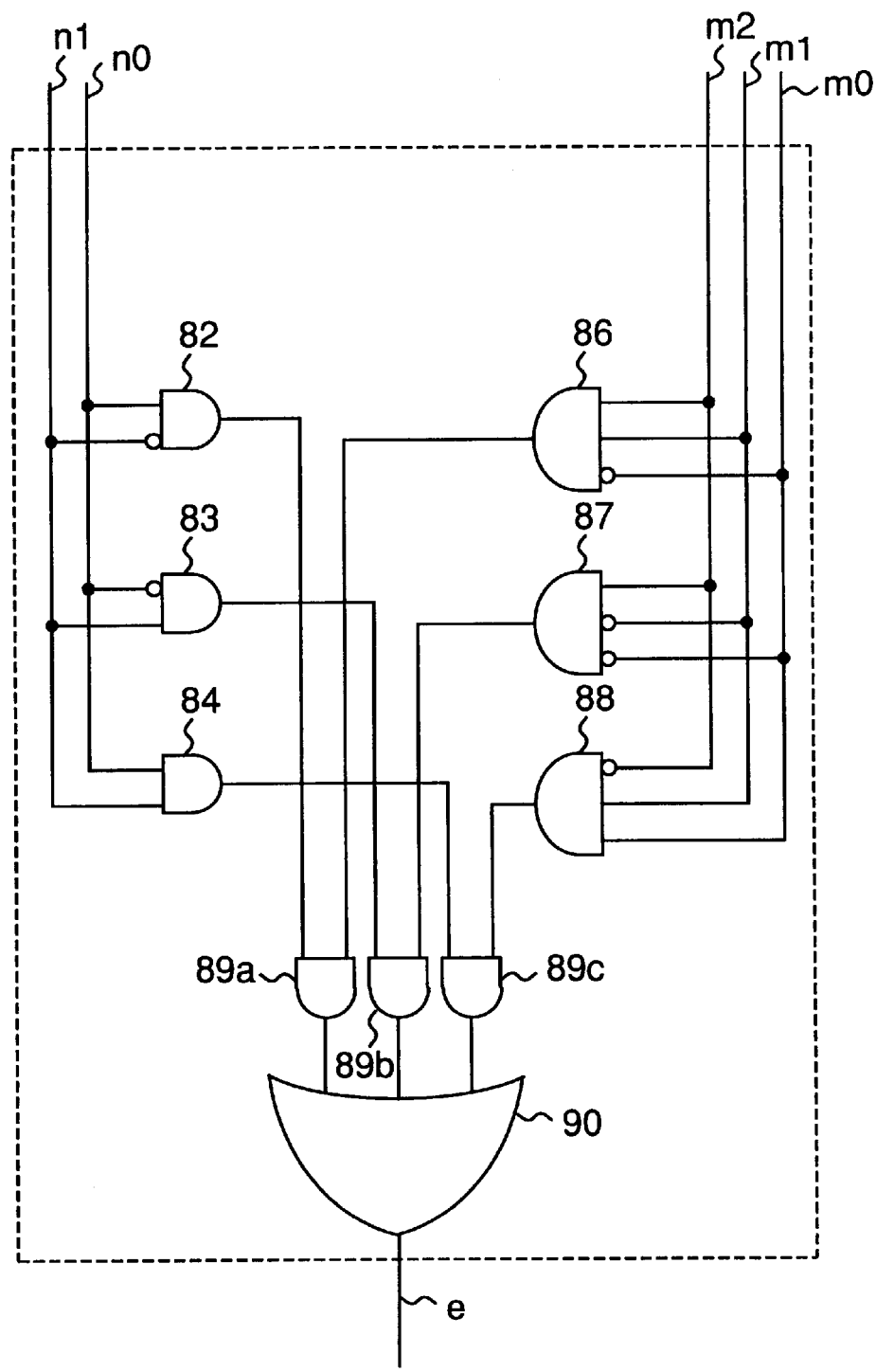
FIG. 4 is a block diagram showing a construction of a selector unit used in the present embodiment.
Figure 5:
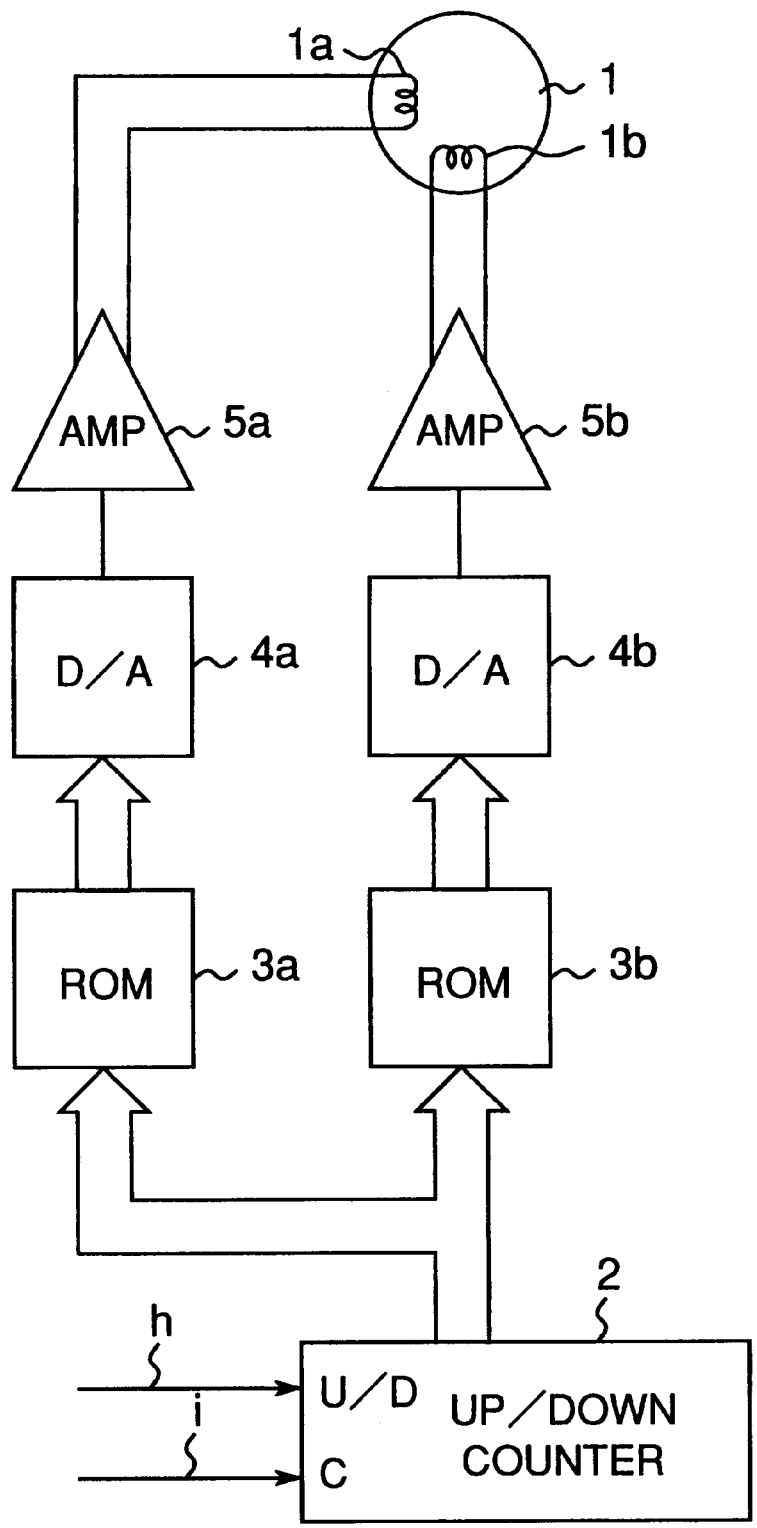
FIG. 5 is a block diagram showing a construction of a conventional drive control device for a stepping motor.

The following describes a second aspect of the invention with reference to FIG. 4, employing an example of a construction of the selector unit 8 in the case where the step number "n" is 3.

In FIG. 4, reference numerals 82, 83 and 84 denote step number judging units for judging the state of the number "n" of the steps, reference numerals 86, 87 and 88 denote count value judging units for judging the count value "m", reference numerals 89a, 89b and 89c denote AND circuits for obtaining ANDs (i.e., logical products) between the outputs of the step number judging units 82 to 84 and the outputs of the count value judging units 86 to 88, and reference numeral 90 denotes an OR gate for obtaining an "OR" (i.e., logical sum) of the outputs of the AND circuits 89a to 89c.

Reference numerals n0 and n1 denote first and second binary digits of the step number "n" of the data "a" held by the latch unit 12, respectively, while reference numerals m0, m1 and m2 denote first, second and third binary digits the count value data "m" generated by the counter 7, respectively.

In this arrangement, in the case where the clock pulse signal "d" is applied 12 times to the counter 7 during the period T0 as shown in FIG. 3D, by substituting T0/Tc=12 into the equation (1), the resultant values of m=12, 6, 4, 3 are obtained when n=0, 1, 2, 3 are substituted, respectively.

When n=3, the output of the AND circuit 84 is of HIGH level, and when m=3, the output of the AND circuit 88 is also of HIGH level, and then the output of the AND circuit 89c is of HIGH level, and in this case the count signal "e"0 is generated three times via the OR gate 90 every count value of m=3.

in a similar manner, when the counter value "m" of the counter 7 is 4 under the condition of n=2, the count signal "e" is generated two times via the AND circuits 83, 87 and 89b every count value of m=4. Also, when the counter value "m" of the counter 7 is 6 under the condition of n=1, the count signal "e" is generated one time via the AND circuits 82, 86 and 89a every count value of m=6. When n=0, the count signal "e" is not generated. By this operation, the number of the pulse generation times of the count signal "e" is same as that of the step number "n". Thus, the count signal "e" generated by the selector unit 8 in the period T0 can be used in the up/down counter 2 for generating the count value data "g" indicating a step count value for designating a rotor angular position of the motor 1.

In this preferred embodiment, the count signal "e" of pulses having a constant interval T1 is generated by the selector unit 8 in accordance with the step number "n" output of the latch unit 12 and the count value "m" output of the counter 7 until the down-counted value "f" output of the down counter 9 is reduced to be 0. Thus, by merely supplying the step data "a" including a step number "n" at a constant interval (T0) by way of e.g. a microcomputer to the step signal generator, the stepping motor can be rotated to a target position with a high accuracy in positioning together with a smooth rotation.

As described above, according to the first aspect of the present invention, even when the step number of the stepping motor is increased to increase the division segments of a dummy sine wave stored in ROMs, the processing time of a microcomputer is not affected, and therefore a high accuracy in step drive positioning of a stepping motor can be advantageously obtained with smooth rotation thereof.

According to the second aspect of the present invention, it is not necessary to use an arithmetic circuit such as a dividing circuit for calculating a count value "m", for the step number "n", and therefore a high speed processing can be attained with a simple and easy construction.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claim, they should be construed as included therein.

What is claimed is:

1. A drive control device for controlling a microstep drive of a stepping motor comprising:

a step signal generator for generating a step pulse signal at an interval of a constant period;

an exciting signal generator section for generating an exciting signal in accordance with the step pulse signal; and a drive signal generator section for generating a drive signal for driving the stepping motor in accordance with the exciting signal, wherein the step pulse signal with the constant period (T1) is obtained in the step signal generator based on externally supplied step data including a step number (n) of a constant period (T0) designating a rotation of the stepping motor to a target position.

2. The drive control device as claimed in claim 1, wherein said step signal generator includes a selector unit for generating the step pulse signal in accordance with the step number (n) which is output of a latch unit and a count value (m) which is output of a counter until a count value output of a down counter is down-counted to be 0.

3. The drive control device as claimed in claim 2, wherein the data indicating the number (n) of steps for rotating the stepping motor to a target position together with a rotational direction signal is calculated by way of a microcomputer and the calculated data is applied to the latch unit and down counter in parallel at a timing with a constant interval of a period (T0).

4. The drive control device as claimed in claim 3, wherein said step signal generator further includes a SR latch unit and, in synchronization with the calculated data, a setting signal of a synchronization pulse signal having the same constant period (T0) is simultaneously applied to the latch unit, down counter and SR latch unit in parallel and, upon receipt of the setting pulse signal, the data including the step number (n) is held in the latch unit and down counter and, at the same time, the SR latch unit is established to generate High of a binary output signal.

5. The drive control device as claimed in claim 4, wherein said step signal generator further includes an AND circuit and the output signal of the SR latch unit is applied to the ADN circuit together with application of an external reference clock pulse having a constant period (Tc) to thereby generate a clock pulse signal having the same constant period (Tc) in synchronization with the reference clock pulse and the clock pulse signal output of the AND circuit is fed to the counter to generate the counted value (m) which is applied to the selector unit, and at the same time, the data including the step number (n) held by the latch unit is also applied to the selector unit so that the selector unit generates the step pulse signal at predetermined timings with a constant time interval (T1).

6. The drive control device as claimed in claim 5, wherein, assuming that the number of the steps included in the data held by the latch unit is "n" and that the count value data counted by the counter is "m" where "m" is an integer equal to or larger than 1, the step pulse signal is generated from the selector unit at a timing when the count value "m" meets the following condition:

$$m = T0/[Tc \times (n+1)] \qquad (1)$$

where T0 is the period of applying the data of the step number "n" and Tc is the period of the count value data.

7. The drive control device as claimed in claim 6, wherein the step pulse signal output of the selector unit is fed back to the counter for resetting the counting operation thereof and is also applied to the down counter to start the down count operation of the data held therein from the initialized value of the step number "n" to generate the down-counted value signal which is applied to the SR latch unit.

8. The drive control device as claimed in claim 7, wherein the step pulse signal output of the selector unit is generated "n" times with a constant interval of a period (T1) during the constant period T0 every time the count value "m" output of the counter satisfies the equation.

9. The drive control device as claimed in claim 8, wherein said selector unit includes step number judging units for judging the state of the number "n" of the steps, count value judging units for judging the count value "m", AND circuits for obtaining logical products between the outputs of the step number judging units and the outputs of the count value judging units, and an OR circuit for obtaining a logical sum of the outputs of the AND circuits.

10. The drive control device as claimed in claim 1, wherein said exciting signal generator section includes an up/down counter and the step pulse signal generated by the step signal generator is fed to the up/down counter for designating steps for each angular position of the stepping motor and is counted up or down by the up/down counter to thereby generate the count value data which is used as address data indicating a step count value for designating a rotor angular position of the stepping motor.

* * * * *